Patented Feb. 16, 1954

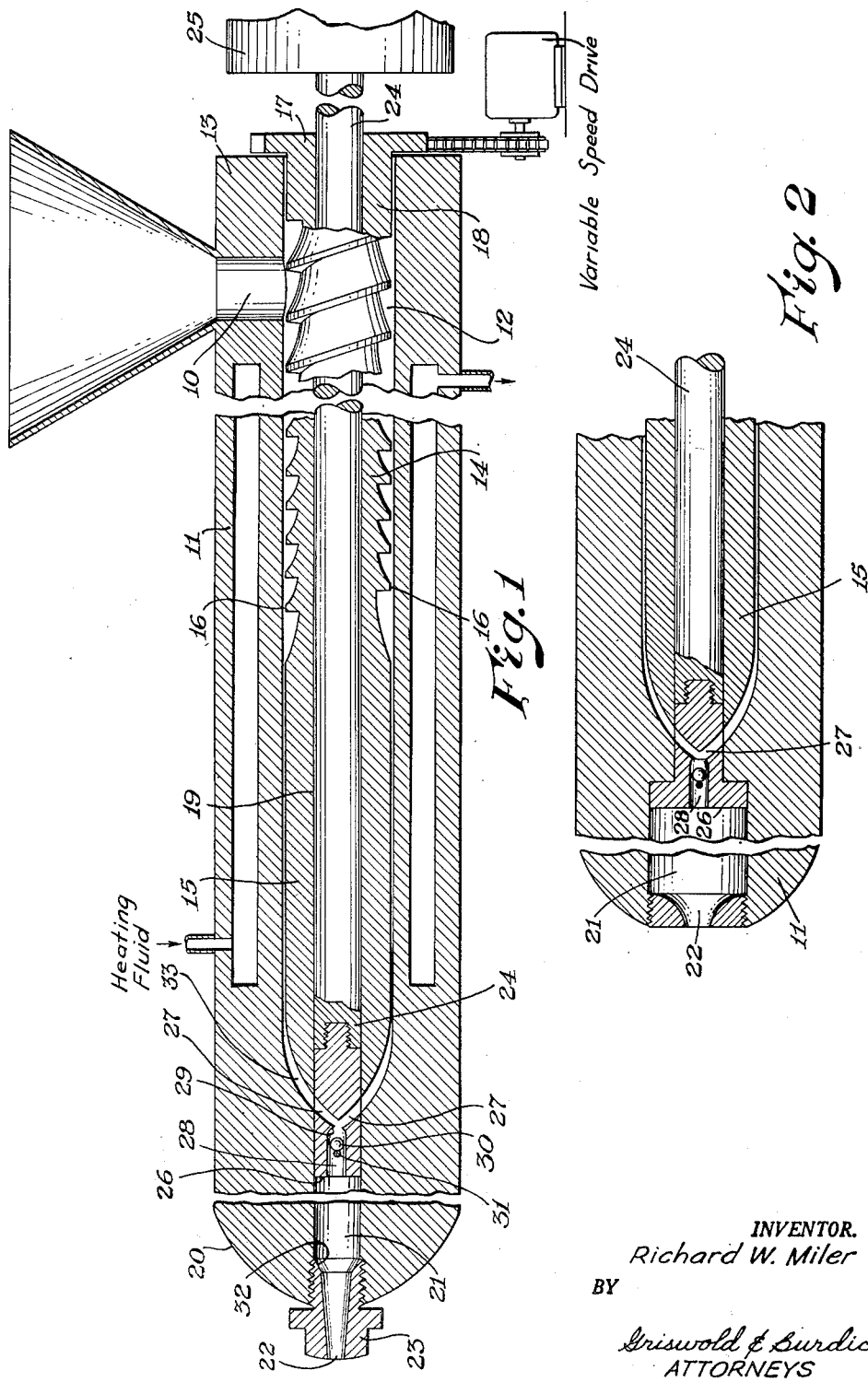

2,668,986

UNITED STATES PATENT OFFICE 2,668,986

PLASTIC MOLDING MACHINE

Richard W. Miler, Midland, Mich., assignor to The Dow Chemical Company, Midland, Mich., a corporation of Delaware Application August 22, 1952, Serial No. 305,757

3 Claims. (Cl. 18—30)

This invention relates to a machine for plasticating organic thermoplastic materials and forwarding them either to closed molds or to open extrusion orifices. It relates in particular to a machine which can be used, at will, as a plastics extruder, plastics injection molding press, or as a pump for viscous fluids such as molten plastics.

It is common practice, in the injection molding of plastics, to supply a charge of solid granules of the desired composition to the heated cylindrical barrel of an injection molding machine and then to push the plastic material rapidly, by means of a hydraulic ram, along the barrel and through a narrow annular space between a coaxial torpedo and the barrel, thence through a nozzle into a mold. The only opportunity for the material to become fluid is in the brief interval in which it is pushed, under high pressure, past the torpedo. As a consequence, it is generally recognized that there is need for improving the method of melting or plasticating the feed to an injection molding press if the output of the machine is to be of uniform quality. It was in an attempt to achieve the latter desired result that the machine of the present invention was developed.

The new machine, having a drive and feed end and a discharge end, comprises a heated and usually horizontal barrel extending through most of its length and having a feed opening near one end; a rotary screw, preferably compressive, in the barrel and extending forward from said feed end with only working clearance in the barrel; an elongated plasticating torpedo rotatable with the screw at the forward end of the screw; a ram coaxial with the screw and torpedo and adapted to slide longitudinally therein, said ram extending from outside the barrel at the feed end entirely through the screw and beyond the nose of the torpedo; radial and forwardly directed flow channels in the forward end of the ram, following the contour of the nose of the torpedo when the ram is retracted, converging at the axis of the ram and extending along said axis through its forward end; a cylindrical receiving chamber in the head of the machine coaxial with the main barrel thereof, extending from just beyond the tip of the torpedo to a plastics discharge port and being of a size to provide a sliding fit for the forward end of said ram; means for rotating the screw and torpedo; means for advancing the ram into said receiving chamber far enough to cut off communication between the barrel and chamber and to expel plastic from the chamber and for retracting the ram far enough to restore communication between the barrel and said chamber; and, optionally, means for decreasing the rate of rotation of the screw when the ram is advanced and for increasing it again when the ram is retracted.

The apparatus of the invention is illustrated in the annexed drawing, Fig. 1 of which is a longitudinal view of the entire machine in vertical section, while Fig. 2 is a similar but fragmentary view of a portion of the machine.

A feed opening 10, through housing 11 into barrel 12 near the drive end 13 of the machine, delivers granular or other suitable plastic feed to a conventional forwarding screw 14. Barrel 12 is heated by any conventional means, not shown. An elongated torpedo 15, illustrated as being cylindrical, is attached as an extension to the forward end of screw 14 and is rotatable therewith. Torpedo 15 and the lands 16 of screw 14 have the usual small clearance in barrel 12, to shear the viscous film of plastic between the barrel and those rotating parts. Screw 14 and its attached torpedo 15 are driven by conventional means, such as a variable speed drive, suitably through pinion 17, attached to rear bearing 18 just outside of housing 11. Torpedo 15 and the hub of screw 14 are axially bored throughout their length, forming a second barrel or tunnel 19, coaxial with barrel 12. Barrel 12 tapers down at its forward end, following generally the contour of the tip of torpedo 15. The discharge end 20 of housing 11 is bored at least as large as tunnel 19 and in alignment therewith, to provide a receiving chamber 21 between barrel 12 and the discharge port 22, illustrated as being in a conventional injection nozzle 23. A cylindrical ram 24, of a diameter to provide a snug sliding fit in tunnel 19, extends from a hydraulic cylinder 25 outside of pinion 17 through the entire length of tunnel 19, its forward tip 26 extending into receiving chamber 21. When chamber 21 is larger than tunnel 19, the forward end 26 of ram 24 is made large enough to have a sliding fit in chamber 21, as shown in Fig. 2. Forwardly directed flow channels 27 are drilled into ram 24 along lines following generally the contour of the tip of torpedo 15, said channels 27 converging at the axis of ram 24 in a single axial channel 28 in communication with receiving chamber 21. If desired, channel 28 may be provided with a ball-check valve consisting of a seat 29, ball 30 and stop pin 31 to limit the travel of ball 30. A similar valve may be situated advantageously in nozzle 23. The forward and return strokes of ram 24 may be limited in the usual way by stops mounted on the portion of the ram between the hydraulic cylinder 25 and tunnel 19.

In operation as an injection molding machine, ram 24 is retracted to the illustrated position, while plastic feed is advanced through heated barrel 12 by the screw 14. The molten plastic advances through the narrow annular space around torpedo 15, and is thoroughly plasticated by the time it reaches flow channels 27, through which it is forced by the oncoming plastic material. The plasticated mass flows through channels 27 and 28 into receiving chamber 21. When the latter is full, the ram 24 is advanced, forcing the plastic material through outlet port 22 and usually into a mold. Ram 24 is retracted to the illustrated position, and chamber 21 again begins to fill with plastic. If, under the molding conditions employed, it is necessary to hold ram 24 in its advanced position for any prolonged period, it is desirable to stop, or at least to diminish the rate of rotation of the feed screw 14 and torpedo 15 until ram 24 can be retracted and communication is restored between barrel 12 and receiving chamber 21. This can be accomplished through a variable speed drive, acting through pinion 17. Since advance of ram 24 a distance equal to the diameter of channels 27 effectively seals those channels against backflow of the plastic material, the ball-check valve 30 may be omitted from the leading end of the ram, when the receiving chamber is of the same diameter as tunnel 19

If desired, the apparatus can be used as an extruder or pump, and this may conveniently be done in connection with molding operations. Thus, the ram may remain retracted while hot plastic material fills and overflows chamber 21, with port 22 in communication with a mold of much greater capacity than chamber 21. When such a mold has been filled in that manner, the ram may be advanced to pack into the mold an additional amount of the plastic from chamber 21.

The machine may also be used to pump measured quantities of viscous liquids. Thus, the screw will operate to fill chamber 21 and the ram will discharge a measured volume, and such operations need have no relation to molding processes.

The illustrated cylindrical torpedo 15 may be replaced by rotary torpedoes of other shapes, including, but without limitation, the helically grooved mixing torpedoes of U. S. Patents 2,453,088 and 2,607,077. In each case the forward end of barrel 12 will most advantageously follow approximately the contour of the torpedo, leaving such clearance as is needed to permit flow of the hot plastic, and providing smooth lands to the openings of channels 27.

The foregoing description and the accompanying drawings have been concerned with preferred embodiments of the invention. It is to be understood that changes may be made as to shape, size and arrangement of parts, within the scope of the invention as defined in the appended claims.

I claim:

1. In a plasticating machine having a feed opening into a working barrel near one end, said barrel being constricted near the other end of the machine, means for heating said barrel; a forwarding screw for conveying plastics from the feed opening along the heated barrel; a rotary torpedo as an extension on said screw within said barrel; and external means for driving said screw and torpedo, the improvement which consists in: a longitudinal bore through the screw and torpedo, a ram in said bore, coaxial with the screw and torpedo and adapted to slide longitudinally therein, said ram extending from outside the barrel at the feed end entirely through the screw section and beyond the nose of the torpedo into a receiving chamber; forwardly directed radial flow channels in the ram, beyond but following the contour of the nose of the torpedo, converging at the axis of the ram and extending along said axis through the forward end of the ram; a cylindrical receiving chamber in the head of the machine, coaxial with the bore through the screw and torpedo, extending from the constricted end of the barrel to a plastics discharge port; and means for advancing the ram into said receiving chamber far enough to cut off communication between the barrel and chamber and to expel plastic from the chamber and for retracting the ram far enough to restore communication between the barrel and said chamber.

2. The improved machine claimed in claim 1, in cooperation with means for decreasing the rate of rotation of the screw when the ram is advanced and for increasing it again when the ram is retracted.

3. The improved machine claimed in claim 1, wherein the receiving chamber is of greater diameter than the bore through the screw and torpedo, and wherein the forward end of the ram is enlarged to provide a sliding fit in said chamber.

RICHARD W. MILER.

References Cited in the file of this patent

UNITED STATES PATENTS

| Number | Name | Date |
|--------|------|------|
| 2,359,839 | Goessling | Oct. 10, 1944 |

FOREIGN PATENTS

| Number | Country | Date |
|--------|---------|------|
| 676,602 | Great Britain | July 30, 1952 |